(12) United States Patent
Kanno et al.

(10) Patent No.: US 9,610,938 B2
(45) Date of Patent: Apr. 4, 2017

(54) CONTROL APPARATUS FOR HYBRID VEHICLE

(71) Applicant: TOYOTA JIDOSHA KABUSHIKI KAISHA, Toyota-shi, Aichi-ken (JP)

(72) Inventors: Yoshihito Kanno, Numazu (JP); Gohki Kinoshita, Isehara (JP); Hiroki Morita, Hiratsuka (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/899,762

(22) PCT Filed: Jun. 24, 2013

(86) PCT No.: PCT/JP2013/067273
§ 371 (c)(1),
(2) Date: Dec. 18, 2015

(87) PCT Pub. No.: WO2014/207810
PCT Pub. Date: Dec. 31, 2014

(65) Prior Publication Data
US 2016/0137187 A1 May 19, 2016

(51) Int. Cl.
*B60L 9/00* (2006.01)
*F04B 17/00* (2006.01)
(Continued)

(52) U.S. Cl.
CPC .............. *B60W 20/19* (2016.01); *B60K 6/24* (2013.01); *B60K 6/445* (2013.01); *B60K 6/48* (2013.01);
(Continued)

(58) Field of Classification Search
USPC ............... 701/22; 417/410.1; 180/65.275
See application file for complete search history.

(56) References Cited

U.S. PATENT DOCUMENTS

| 6,009,965 A | 1/2000 | Takanohashi et al. |
| 2007/0169970 A1* | 7/2007 | Kydd ............... B60K 6/48 180/65.275 |

(Continued)

FOREIGN PATENT DOCUMENTS

| JP | H02-286844 | 11/1990 |
| JP | H1162653 A | 3/1999 |

(Continued)

*Primary Examiner* — Tyler Paige
(74) *Attorney, Agent, or Firm* — Andrews Kurth Kenyon LLP

(57) ABSTRACT

A control apparatus, which is configured to control a hybrid vehicle, is provided with: a device configured to determine whether or not there is a response delay of the supercharger; a device configured to control torque of the rotary electric machine to compensate for an insufficiency of torque of a drive shaft if there is the response delay when an output limit value of the battery is greater than or equal to a predetermined value; a device configured to estimate a NOx storage amount in the NOx storage/reduction catalyst; and a device configured to control an air-fuel ratio of the internal combustion engine to be rich if the NOx storage amount is greater than or equal to a predetermined value, or if there is the response delay when the output limit value of the battery is less than the predetermined value.

3 Claims, 7 Drawing Sheets

(51) Int. Cl.

| | | |
|---|---|---|
| *B60W 20/00* | (2016.01) | |
| *B60W 20/19* | (2016.01) | |
| *B60K 6/445* | (2007.10) | |
| *B60W 10/06* | (2006.01) | |
| *F02D 41/02* | (2006.01) | |
| *F02D 41/10* | (2006.01) | |
| *F02D 41/14* | (2006.01) | |
| *F02D 23/00* | (2006.01) | |
| *F02D 41/00* | (2006.01) | |
| *F02D 29/02* | (2006.01) | |
| *B60W 20/16* | (2016.01) | |
| *B60K 6/24* | (2007.10) | |
| *B60W 10/08* | (2006.01) | |
| *B60K 6/48* | (2007.10) | |
| *B60L 11/14* | (2006.01) | |
| *B60L 11/18* | (2006.01) | |
| *B60L 15/20* | (2006.01) | |
| *F02B 29/04* | (2006.01) | |

(52) U.S. Cl.
CPC ........... *B60L 11/14* (2013.01); *B60L 11/1851* (2013.01); *B60L 15/2045* (2013.01); *B60W 10/06* (2013.01); *B60W 10/08* (2013.01); *B60W 20/00* (2013.01); *B60W 20/16* (2016.01); *F02D 23/00* (2013.01); *F02D 29/02* (2013.01); *F02D 41/0007* (2013.01); *F02D 41/0275* (2013.01); *F02D 41/10* (2013.01); *F02D 41/1475* (2013.01); *B60L 2240/12* (2013.01); *B60L 2240/36* (2013.01); *B60L 2240/423* (2013.01); *B60L 2240/44* (2013.01); *B60L 2240/443* (2013.01); *B60L 2240/545* (2013.01); *B60L 2250/26* (2013.01); *B60W 2510/0633* (2013.01); *B60W 2510/244* (2013.01); *B60W 2710/0622* (2013.01); *B60W 2710/083* (2013.01); *B60W 2720/30* (2013.01); *B60Y 2200/92* (2013.01); *B60Y 2400/435* (2013.01); *F02B 29/0406* (2013.01); *F02D 2200/0806* (2013.01); *F02D 2200/503* (2013.01); *Y02T 10/144* (2013.01); *Y02T 10/6239* (2013.01); *Y10S 903/93* (2013.01)

(56) References Cited

U.S. PATENT DOCUMENTS

| | | | |
|---|---|---|---|
| 2008/0219866 A1* | 9/2008 | Kwong | B60K 6/46 417/410.1 |
| 2009/0088944 A1* | 4/2009 | Aswani | B60K 6/387 701/103 |
| 2010/0251996 A1 | 10/2010 | Akimoto | |
| 2014/0103761 A1* | 4/2014 | Atkins | B60K 6/105 310/74 |
| 2016/0137187 A1* | 5/2016 | Kanno | B60W 20/00 701/22 |

FOREIGN PATENT DOCUMENTS

| | | |
|---|---|---|
| JP | 2004092455 A | 3/2004 |
| JP | 2004092456 A | 3/2004 |
| JP | 2006258015 A | 9/2006 |
| JP | 2009036153 A | 2/2009 |
| JP | 2010241170 A | 10/2010 |

\* cited by examiner

CONTROL APPARATUS FOR HYBRID VEHICLE

CROSS-REFERENCE TO RELATED APPLICATION

This is a national phase application based on the PCT International Patent Application No. PCT/JP2013/067273 filed Jun. 24, 2013, the entire contents of which are incorporated herein by reference.

TECHNICAL FIELD

The present invention relates to a control apparatus for a hybrid vehicle, configured to control a hybrid vehicle provided with a supercharger.

BACKGROUND ART

As this type of apparatus, there is an apparatus configured to control degree of supercharging and motor torque, according to a charge state of a battery (refer to Patent Literature 1).

In the hybrid vehicle, there is also an apparatus configured to suppress a rapid increase in engine torque during a rich spike process by using regenerative braking force of a motor (refer to Patent Literature 2).

Moreover, in the hybrid vehicle, there is also an apparatus configured to perform ignition timing lag correction, intake air amount increasing correction, fuel supply amount decreasing correction, or similar actions, if required power exceeds an output limit during catalyst warm-up (refer to Patent Literature 3).

Moreover, in a hybrid vehicle provided with a supercharger and a NOx trap catalyst, there is also an apparatus configured to perform rich spike control according to NOx concentration in an exhaust gas (refer to Patent Literature 4).

Moreover, in a hybrid vehicle provided with a supercharged engine, there is also an apparatus configured to enrich a fuel mixture ratio in a fuel increasing, which is determined on the basis of a change rate of an accelerator opening degree (refer to Patent Literature 5).

CITATION LIST

Patent Literature

Patent Literature 1: Japanese Patent Application Laid Open No. 2004-092455
Patent Literature 2 Japanese Patent Application Laid Open No. Hei11-062653
Patent Literature 3: Japanese Patent Application Laid Open No. 2010-241170
Patent Literature 4: Japanese Patent Application Laid Open No. 2009-036153
Patent Literature 5: Japanese Patent Application Laid Open No. 2006-258015

SUMMARY OF INVENTION

Technical Problem

In the hybrid vehicle provided with the supercharger, in some cases, there is a response delay of the supercharger when acceleration is required. Here, it is meaningful to use motor torque to compensate for insufficient torque of drive wheels caused by the response delay. An upper limit of the motor torque, however, is restricted by an output limit of the battery. Therefore, if the motor torque that exceeds the output limit of the battery is required, a reduction in power performance caused by the response delay becomes apparent. The apparatuses disclosed in the Patent Literatures described above cannot avoid such a reduction in power performance.

In view of the aforementioned problems, it is therefore an object of the present invention to provide a control apparatus for a hybrid vehicle, configured to suppress the reduction in power performance caused by the response delay of a supercharger, in the hybrid vehicle provided with the supercharger.

Solution to Problem

The above object of the present invention can be achieved by a control apparatus for a hybrid vehicle, configured to control a hybrid vehicle, the hybrid vehicle is provided with: an internal combustion engine comprising a supercharger and a NO storage/reduction catalyst, the internal combustion engine being configured to be operated at an air-fuel ratio that is leaner than a stoichiometric ratio; a rotary electric machine configured to input/output torque to/from a drive shaft coupled with drive wheels; and a battery configured to input/output electric power, said control apparatus is provided with: a determining device configured to determine whether or not there is a response delay of the supercharger; a torque controlling device configured to control torque of the rotary electric machine to compensate for an insufficiency of torque of the drive shaft if it is determined that there is the response delay when an output limit value of the battery is greater than or equal to a predetermined value; an estimating device configured to estimate a storage amount of NOx in the NOx storage/reduction catalyst; and an air-fuel ratio controlling device configured to control an air-fuel ratio of the internal combustion engine to be richer than the stoichiometric ratio if the estimated storage amount is greater than or equal to a predetermined value, or if it is determined that there is the response delay when the output limit value of the battery is less than the predetermined value.

The "NOx storage/reduction catalyst" according to the present invention means such a catalyst apparatus that NOx is stored in a period in which the internal combustion engine is operated at the air fuel ratio that is leaner than the stoichiometric ratio (hereinafter expressed as a "lean air-fuel ratio" as occasion demands) and that the stored NOx is reduced in a period in which the internal combustion engine is operated at an air fuel ratio that is richer than the stoichiometric ratio (hereinafter expressed as a "rich air-fuel ratio" as occasion demands). The control apparatus for the hybrid vehicle according to the present invention is presumed to have such a vehicle configuration that the internal combustion engine is provided with the supercharger, such as, for example, a turbocharger, and the NOx storage/reduction catalyst.

The internal combustion engine according to the present invention conceptually includes an internal combustion engine that can be operated at the lean air-fuel ratio, and the control of the air-fuel ratio in the internal combustion engine according to the present invention is not limited to changing the air-fuel ratio in a binary manner between the lean air-fuel ratio and the rich air-fuel ratio. For example, control of setting a stoichiometric air-fuel ratio between the lean air-fuel ratio and the rich air-fuel ratio may be performed. Moreover, control of changing the air-fuel ratio stepwise may be performed.

According to the control apparatus for the hybrid vehicle according to the present invention, if it is predicted that there is the response delay of the supercharger when the output limit value of the battery is less than the predetermined value, a process of temporally setting the air-fuel ratio to be richer than the stoichiometric ratio (hereinafter expressed as "rich spike" as occasion demands) is performed. If the rich spike is performed, a fuel injection amount is increased in comparison with the case of the lean air-fuel ratio, and thus, the torque of the internal combustion engine increases. It is therefore possible to preferably suppress a temporal reduction in power performance caused by the response delay of the supercharger.

Here, the torque increase action by the rich spike is well known; however, conventionally, the rich spike is performed at timing based on the NOx storage amount, in order to regenerate the catalyst. In other words, conventionally, there is no such a technical idea that the rich spike is performed at timing that is not derived from the NOx storage amount. This is natural for the purpose of the rich spike in a lean burn internal combustion engine provided with the NOx storage/reduction catalyst.

On the other hand, the present invention is based on such a technical idea that the torque increase effect by the rich spike is used to suppress the reduction in power performance, after finding a possibility that the output (i.e. a discharge amount) of the battery conflicts with the output limit value when the insufficiency of the torque of the drive shaft (hereinafter expressed as "drive shaft torque" as occasion demands) caused by the response delay of the supercharger is compensated for by the torque of the rotary electric machine. The reduction of the stored NOx proceeds without a problem even though the rich spike is performed at the timing that is not derived from the NOx storage amount. Thus, according to the present invention, the rich spike can be used, more meaningfully.

In one aspect of the control apparatus for the hybrid vehicle according to the present invention, said torque controlling device controls the rotary electric machine in such a manner that an excess of the torque of the drive shaft is regenerated as electric power if the torque of the drive shaft is excessive in a period in which the air-fuel ratio is controlled to be richer than the stoichiometric ratio.

If the drive shaft torque is compensated for by the rich spike in view of the output limit of the battery, the drive shaft torque becomes excessive for a required value, in association with an increase in intake air amount of the internal combustion engine (or the amount of an intake air sucked into cylinders) or at a time point of starting the rich spike.

According to this aspect, the excess is regenerated as the electric power via the rotary electric machine. It is therefore possible to preferably maintain the drive shaft torque at the required value.

In this aspect, said air-fuel ratio controlling device sets the air-fuel ratio to be leaner than the air-fuel ratio that is controlled to be richer than the stoichiometric ratio, if an electric power regeneration amount according to the excess is greater than or equal to an input limit value of the battery.

In regenerating the excess of the drive shaft torque as the electric power, as described above, if the rich spike is not allowed when the electric power regeneration amount conflicts with the input limit value of the battery, it is then possible to prevent the battery from being over-charged.

The air-fuel ratio when the electric power regeneration amount conflicts with the input limit value as described above, may be leaner than the rich air-fuel ratio when the rich spike is performed. For example, in this case, the air-fuel ratio may be quickly changed from the rich air-fuel ratio to the lean air-fuel ratio as the control air-fuel ratio, or may be changed stepwise toward the lean air-fuel ratio as the control air-fuel ratio, through the stoichiometric air-fuel ratio or an air-fuel ratio near the stoichiometric air-fuel ratio.

Alternatively, considering the situation in which the electric power regeneration amount conflicts with the input limit value, the air-fuel ratio may be changed to be leaner than the stoichiometric ratio in a range in which there is electric consumption of the rotary electric machine because driving force of the internal combustion engine is insufficient for required driving force.

The operation and other advantages of the present invention will become more apparent from embodiments explained below.

DESCRIPTION OF EMBODIMENTS

Embodiments of the Invention

Hereinafter, various preferred embodiments according to the present invention will be explained with reference to the drawings.

First Embodiment

Configuration of Embodiment

Figure 1:
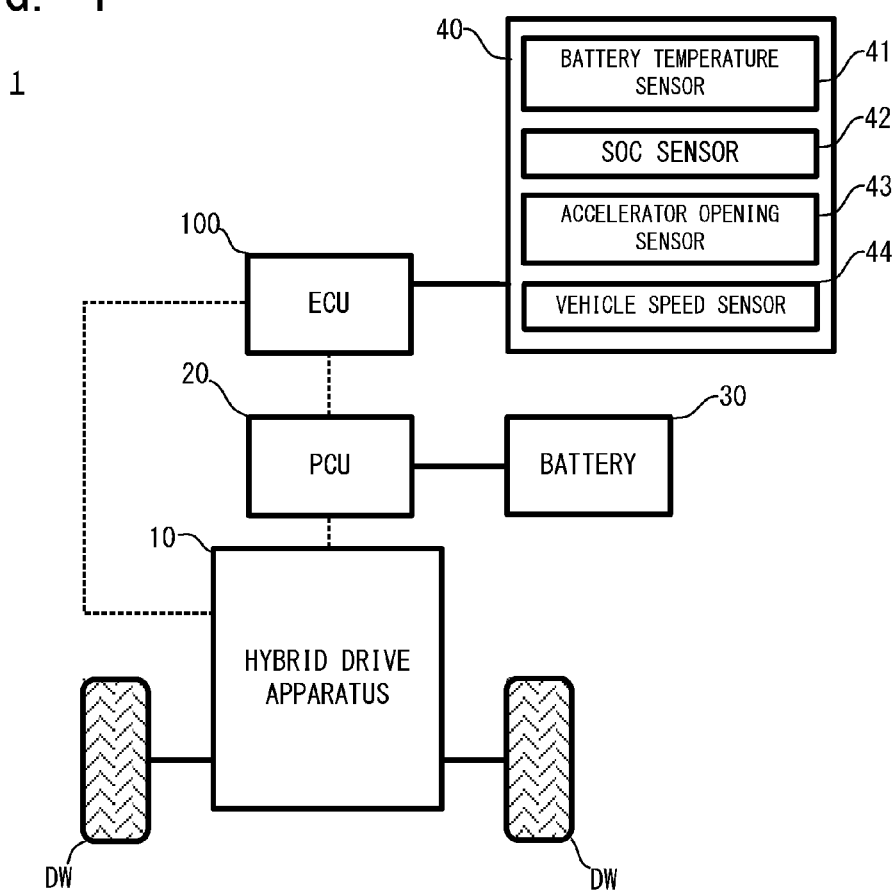
FIG. 1 is a schematic block diagram conceptually illustrating a configuration of a hybrid vehicle according to a first embodiment of the present invention.

Firstly, with reference to FIG. 1, a configuration of a hybrid vehicle 1 according to a first embodiment of the present invention will be explained. FIG. 1 is a schematic block diagram conceptually illustrating the configuration of the hybrid vehicle 1.

In FIG. 1, the hybrid vehicle 1 is one example of the "hybrid vehicle" according to the present invention, which is provided with an electronic control unit (ECU) 100, a hybrid drive apparatus 10, a power control unit (PCU) 20, a battery 30, and a sensor group 40.

The ECU 100 is an electronic control unit, which is provided with a central processing unit (CPU), a read only memory (ROM), a random access memory (RAM), and the like, and which is configured to control the operation of each of the units of the hybrid vehicle 1. The ECU 100 is one example of the "control apparatus for the hybrid vehicle" according to the present invention. The ECU 100 can perform rich spike control described later, in accordance with a control program stored in the ROM.

The PCU 20 is a known power control unit configured to control input/output of electric power between the battery 30 and each motor generator described later. The PCU 20 includes: a system main relay (SMR) configured to block or cut off electrical connection between the battery 30 and an electric power load; a boost converter configured to boost output voltage of the battery 30 up to boost command voltage suitable for the driving of each motor generator; and an inverter configured to convert direct current (DC) power extracted from the battery 30 to alternating current (AC) power and supply it to a motor generator MG1 and a motor generator MG2 described later and configured to convert AC power generated by the motor generator MG1 and the motor generator MG2 to DC power and supply it to the battery 30; and the like (all of which are not illustrated). The PCU 20 is electrically connected to the ECU 100, and the operation thereof is controlled by the ECU 100.

The battery 30 is a chargeable secondary battery unit, which functions as an electric power supply associated with electric power for power running of the motor generator MG1 and the motor generator MG2. The battery 30 is configured in such a manner that a plurality of (e.g. several hundred) unit battery cells, such as, for example, lithium ion battery cells, are connected in series. The battery 30 is one example of the "battery" according to the present invention.

The sensor group 40 is a general term of various sensors configured to detect a state of the hybrid vehicle 1. FIG. 1 illustrates a battery temperature sensor 41, a SOC sensor 42, an accelerator opening sensor 43, and a vehicle speed sensor 44, as the various sensors that constitute the sensor group 40.

The battery temperature sensor 41 is a sensor configured to detect a battery temperature Tbat, which is the temperature of the battery 30. The battery temperature sensor 41 is electrically connected to the ECU 100, and the detected battery temperature Tbat is referred to by the ECU 100, as occasion demands.

The SOC sensor 42 is a sensor configured to detect a state of charge (SOC), which is a residual amount of power storage of the battery 30. The SOC sensor 42 is electrically connected to the ECU 100, and the detected SOC is referred to by the ECU 100, as occasion demands.

The accelerator opening sensor 43 is a sensor configured to detect an accelerator opening degree Ta, which is an opening degree of an accelerator pedal. The accelerator opening sensor 43 is electrically connected to the ECU 100, and the detected accelerator opening degree Ta is referred to by the ECU 100, as occasion demands.

The vehicle speed sensor 44 is a sensor configured to detect a vehicle speed V of the hybrid vehicle 1. The vehicle speed sensor 44 is electrically connected to the ECU 100, and the detected vehicle speed V is referred to by the ECU 100, as occasion demands.

Figure 2:
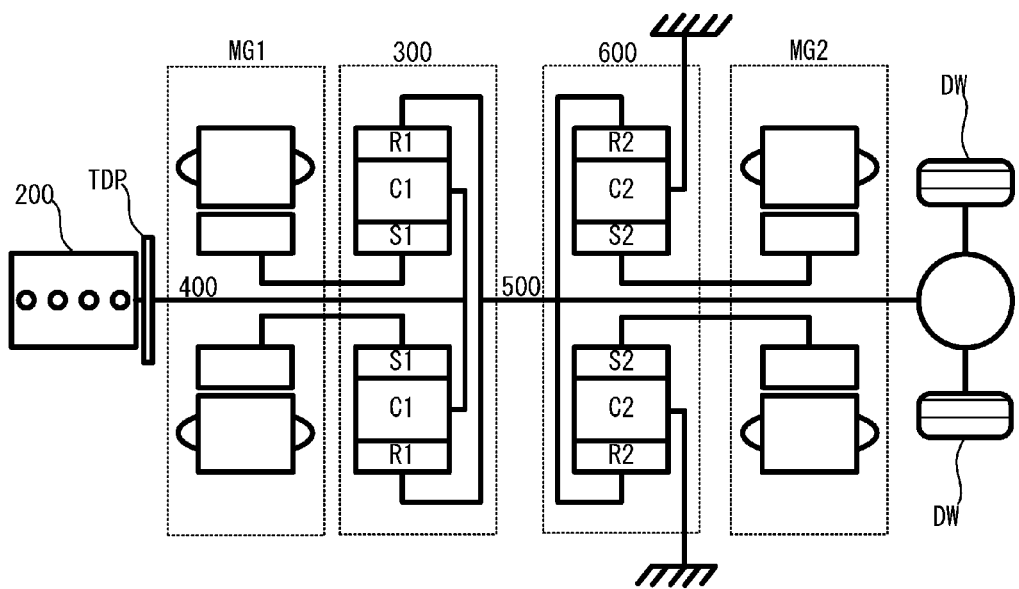
FIG. 2 is a schematic block diagram conceptually illustrating a configuration of a hybrid drive apparatus illustrated in FIG. 1.

The hybrid drive apparatus 10 is a power train of the hybrid vehicle 1. Now, with reference to FIG. 2, a detailed configuration of the hybrid drive apparatus 10 will be explained. FIG. 2 is a schematic block diagram conceptually illustrating the configuration of the hybrid drive apparatus 10. In FIG. 2, the same parts as those in FIG. 1 will carry the same reference numerals, and an explanation thereof will be omitted, as occasion demands.

The hybrid drive apparatus 10 is provided with an engine 200, a power dividing mechanism 300, an input shaft 400, a drive shaft 500, a speed reduction mechanism 600, the motor generator MG1 (hereinafter referred to as "MG1" as occasion demands), and the motor generator MG2 (hereinafter referred to as "MG2" as occasion demands).

The engine 200 is a gasoline engine, which functions as a main power source of the hybrid vehicle 1 and which is one example of the "internal combustion engine" according to the present invention. A detailed configuration of the engine 200 will be described later by using FIG. 3.

The motor generator MG1 is an electric motor generator, which has a power running function for converting electrical energy to kinetic energy and a regeneration function for converting kinetic energy to electrical energy.

The motor generator MG2 is, as in the motor generator MG1, an electric motor generator, which has a power running function for converting electrical energy to kinetic energy and a regeneration function for converting kinetic energy to electrical energy, and which is one example of the "rotary electric machine" according to the present invention.

Each of the motor generators MG1 and MG2 is configured as a synchronous motor generator, and is provided with, for example, a rotor(s) having a plurality of permanent magnets on an outer circumferential surface, and a stator around which a three-phase coil for forming a rotating magnetic field is wound. Of course, the motor generators MG1 and MG2 may have another configuration.

The power dividing mechanism 300 is a known planetary gear mechanism provided with a plurality of rotating elements that perform a differential action on each other.

The power dividing mechanism 300 is provided with: a sun gear S1 placed in a central portion; a ring gear R1 coaxially placed on an outer circumference of the sun gear S1; a plurality of pinion gears (not illustrated) placed between the sun gear S1 and the ring gear R1, the pinion gears revolving while rotating on an outer circumference of the sun gear S1; and a carrier CA1 pivotally supporting respective rotating shafts of the pinion gears.

The sun gear S1 is a reaction element for bearing reaction torque with respect to engine torque Te, which is output torque of the engine 200, and is coupled with a rotor of the motor generator MG1. Therefore, a rotational speed of the sun gear S1 is equal to a MG1 rotational speed Nmg1, which is a rotational speed of the motor generator MG1.

The ring gear R1 is an output element of the power dividing mechanism 300, and is coupled with the drive shaft, which is a power output shaft of the power dividing mechanism 300, in a manner of sharing its rotating shaft. The drive shaft 500 is indirectly coupled with drive wheels DW of the hybrid vehicle 1 via a differential or the like.

The carrier C1 is coupled with the input shaft 400, which is coupled with a crankshaft of the engine 200 described later via a torsion damper TDP, in a manner of sharing its rotating shaft. A rotational speed of the carrier C1 is equal to the number of engine revolutions NE of the engine 200.

Under the aforementioned configuration, the power dividing mechanism 300 can distribute the engine torque Te, which is supplied to the input shaft 400 from the engine 200, to the sun gear S1 and the ring gear R1 by the carrier C1 at a predetermined ratio (or a ratio according to a gear ratio between the gears), and can divide power of the engine 200 into two systems.

At this time, in order to make it easy to understand the power of the power dividing mechanism 300, a gear ratio $\rho$ is defined as the number of teeth of the sun gear S1 to the number of teeth of the ring gear R1. In this case, if the engine torque Te is applied to the carrier C1 from the engine 200, torque Tes, which acts on the sun gear S1, is expressed by the following equation (1), and direct torque or directly transmitted torque Ter, which appears on the drive shaft 500, is expressed by the following equation (2).

$$Tes=Te\times\rho/(1+\rho) \quad (1)$$

$$Ter=Te\times 1/(1+\rho) \quad (2)$$

The speed reduction mechanism 600 is a planetary gear mechanism between the drive shaft 500 and the motor generator MG2, and is provided with rotating elements, such as a sung gear S2, a ring gear R2, pinion gears (not illustrated), and a carrier C2.

In the speed reduction mechanism 600, the sun gear S2 is coupled with a rotor of the motor generator MG2. The carrier C2 is non-rotatably fixed to an outer case of the hybrid drive apparatus 10. The ring gear R2 is coupled with the drive shaft 500. In such a configuration, the speed reduction mechanism 600 can reduce and transmit a rotational speed Nmg2 of the motor generator MG2 to the drive shaft 500, in accordance with a speed reduction ratio determined according to the gear ratio of the rotating elements (or gears).

The configuration of the speed reduction mechanism 600 is merely one form that can be adopted by a mechanism configured to reduce the rotation of the motor generator MG2, and this type of speed reduction mechanism can have various forms in practice. Moreover, this type of speed reduction mechanism is not necessarily provided for the hybrid drive apparatus. In other words, the motor generator MG2 may be directly connected to the drive shaft 500.

Figure 3:
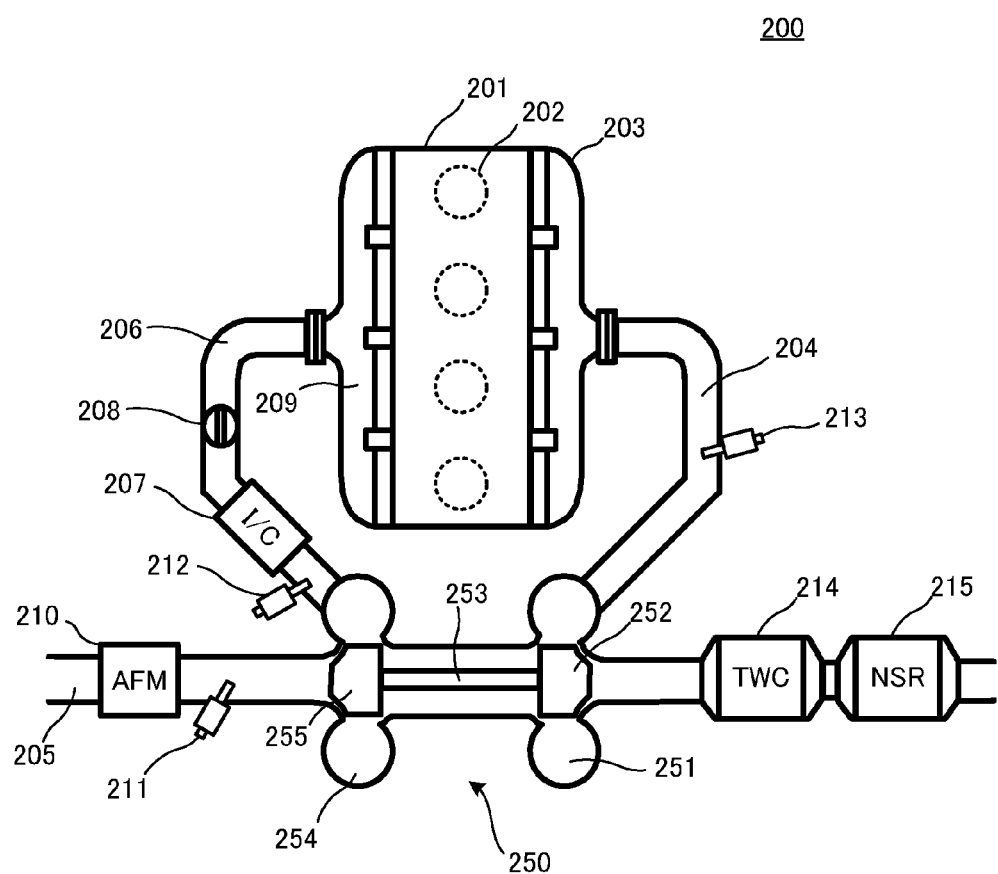
FIG. 3 is a schematic block diagram conceptually illustrating a configuration of an engine illustrated in FIG. 1.

Next, with reference to FIG. 3, the detailed configuration of the engine 200 will be explained. FIG. 3 is a schematic block diagram conceptually illustrating the configuration of the engine 200. In FIG. 3, the same parts as those in FIG. 2 will carry the same reference numerals, and an explanation thereof will be omitted, as occasion demands.

The engine 200 is an in-line four cylinder engine, which uses gasoline as fuel and which is one example of the "internal combustion engine" according to the present invention. The engine 200 has such a configuration that four cylinders 202 are arranged in series in a cylinder block 201. The gasoline as fuel is injected to not-illustrated intake ports, and is sucked into the cylinders as an air-fuel mixture obtained by mixing with the air in an intake stroke. Inside the cylinders, the intake air is ignited by ignition control of a not-illustrated ignition apparatus in a compression stroke, and is burned in a combustion chamber.

Combustion energy associated with the combustion is converted to kinetic energy by driving a not-illustrated crankshaft via a piston and a connecting rod, which are not illustrated. The rotation of the crankshaft is transmitted as the rotation of the input shaft 400 described above, which is coupled with the crankshaft.

An exhaust gas emitted from each of the cylinders in an exhaust stroke is collected in an exhaust manifold 203, and is led to an exhaust tube 204 connected to the exhaust manifold 203.

The engine 200 is provided with a turbocharger 250. The turbocharger 250 is provided with: a turbine blade 252 accommodated in a turbine housing 251; a compressor impeller 255 accommodated in a compressor housing 254; and a turbo rotating shaft 253 configured to couple the turbine blade 252 with the compressor impeller 255. The turbocharger 250 recovers exhaust heat to rotationally drive the turbine blade 252, and uses a fluid compressing action of the compressor impeller 255, which rotates substantially integrally with the turbine blade 252, to supercharge the intake air to the atmospheric pressure or more. The turbocharger 250 is one example of the "supercharger" according to the present invention.

In the engine 200, the air is sucked into an upstream-side intake tube 205 from the exterior via a not-illustrated air cleaner. The intake air is compressed by the rotation of the compressor impeller 255 of the turbocharger 250, and is supplied to a downstream-side intake tube 206 placed on a downstream side of the compressor impeller 255.

In the downstream-side intake tube 20, an intercooler 207 is placed. The intercooler 207 is a cooling apparatus for cooling the intake air after the compression to improve supercharging efficiency.

On a downstream side of the intercooler 207 in the downstream-side intake tube 206, a throttle valve 208 is placed. The throttle valve 208 is a valve for adjusting the amount of the intake air according to an opening/closing state thereof, and the opening/closing state is controlled by a not-illustrated actuator, which is electrically connected to the ECU 100. In other words, the throttle valve 208 is a part of a so-called electronically controlled throttle apparatus.

The downstream-side intake tube 206 is coupled with an intake manifold 209 on a downstream side of the throttle valve 208. The intake manifold 209 is connected to intake ports corresponding to the respective cylinders, the intake ports being formed in the cylinder block 201. The intake air led to the intake manifold 209 is mixed with the gasoline, which is sprayed in the intake ports, and is sucked into the cylinders at the time of opening of not-illustrated intake valves in the respective cylinders, as described above.

In the upstream-side intake tube 205, an airflow meter 210 is placed. The airflow meter 210 is a sensor configured to detect an intake air amount Ga, which is the amount of the intake air sucked from the exterior. The airflow meter 210 is electrically connected to the ECU 100, and the detected intake air amount Ga is referred to by the ECU 100, as occasion demands.

In the upstream-side intake tube 205, a first pressures sensor 211 is placed. The first pressures sensor 211 is a sensor configured to detect pressure of the intake air in the upstream-side intake tube 205, i.e. compressor inlet pressure P0. The first pressures sensor 211 is electrically connected to the ECU 100, and the detected compressor inlet pressure P0 is referred to by the ECU 100, as occasion demands. The compressor inlet pressure P0 is substantially equal to the atmospheric pressure.

In the downstream-side intake tube 206, a second pressures sensor 212 is placed. The second pressures sensor 212 is a sensor configured to detect pressure of the intake air in the downstream-side intake tube 206, i.e. compressor outlet pressure P3. The second pressures sensor 212 is electrically connected to the ECU 100, and the detected compressor outlet pressure P3 is referred to by the ECU 100, as occasion demands. The compressor outlet pressure P3 is substantially equal to supercharging pressure. The ECU 100 always recognizes a compressor outlet/inlet pressure ratio Rp, which is a ratio between the compressor inlet pressure P0 and the compressor outlet pressure P3 (Rp=P3/P0).

In the engine 200, an air-fuel ratio sensor 213 is placed in the exhaust tube 204. The air-fuel ratio sensor 213 is, for example, a limiting current type wide-area air-fuel ratio sensor, provided with a diffusion resistance layer, and is configured to detect an air-fuel ratio of the exhaust gas flowing through the exhaust tube 204 (i.e. an exhaust air-fuel ratio). More specifically, the air-fuel ratio sensor 213 is a sensor configured to output an output voltage value according to the air-fuel ratio of the exhaust gas on an upstream side of a three-way catalyst 214 described later. The output voltage value matches a reference output voltage value if the exhaust air-fuel ratio is stoichiometric (i.e. theoretical air-fuel ratio). Moreover, the output voltage value is less than the reference output voltage value if the exhaust air-fuel ratio is richer than a stoichiometric ratio, and is greater than the reference output voltage value if the exhaust air-fuel ratio is leaner than the stoichiometric ratio. The air-fuel ratio sensor 213 is electrically connected to the ECU 100, and the detected output voltage value is referred to by the ECU 100 with a regular or irregular period, as occasion demands.

The engine 200 according to the embodiment is a so-called lean burn engine, which uses the output voltage value of the air-fuel ratio sensor 213 to be operated basically at a lean air-fuel ratio (e.g. around 20), which is leaner than the stoichiometric ratio. Regarding specific air-fuel ratio control, various known control aspects can be applied. For example, a fuel injection amount of the engine 200 is corrected to a reduction side if the output voltage value of the air-fuel ratio sensor 213 is less than a value corresponding to a control air-fuel ratio (i.e. the aforementioned lean air-fuel ratio) (i.e. if the exhaust air-fuel ratio is richer than the control air-fuel ratio), and is corrected to an increase side if the output voltage value is greater than the value corresponding to the control air-fuel ratio (i.e. if the exhaust air-fuel ratio is leaner than the control air-fuel ratio).

The exhaust gas led to the exhaust tube 204 gives thermal energy to the turbine blade 252 of the turbocharger 250, and is then led to a catalyst system on the downstream side.

The catalyst system is provided with a three-way catalyst 214 and a NOx storage/reduction catalyst 215.

The three-way catalyst 214 is a catalyst apparatus in which noble metal, such as platinum, is carried on a catalyst carrier, and is configured to purify the exhaust gas by allowing an oxidation/combustion reaction of HC and CO and a reduction reaction of nitrogen oxide NOx to proceed at substantially the same time.

The NOx storage/reduction catalyst 215 is a catalyst apparatus in which a NOx storage material, such as alkali metal or alkaline earth metal, and noble metal are carried on a porous carrier, such as alumina. The NOx storage/reduction catalyst 215 is configured in such a manner that NO in the exhaust gas is oxidized to NOx on the noble metal in an atmosphere that is leaner than the stoichiometric ratio, and that the NOx storage material, which is a basic material, neutralizes NOx to form nitrates and nitrites, thereby storing NOx.

The NOx storage/reduction catalyst 215 is configured in such a manner that the stored nitrates and nitrites are decomposed to release NOx in an atmosphere that is richer than the stoichiometric ratio caused by the rich spike described later, and that due to a catalytic action of the noble metal, NOx reacts with reducing agents, such as $H_2$, HC, or CO, to be purified to $N_2$. The reducing agents are supplied by being produced on the three-way catalyst 214 placed on an upstream side of the NOx storage/reduction catalyst 215, or by blowing through the three-way catalyst 214.

Operation of Embodiment

Next, as the operation of the embodiment, the details of the rich spike control performed by the ECU 100 will be explained.

Figure 4:
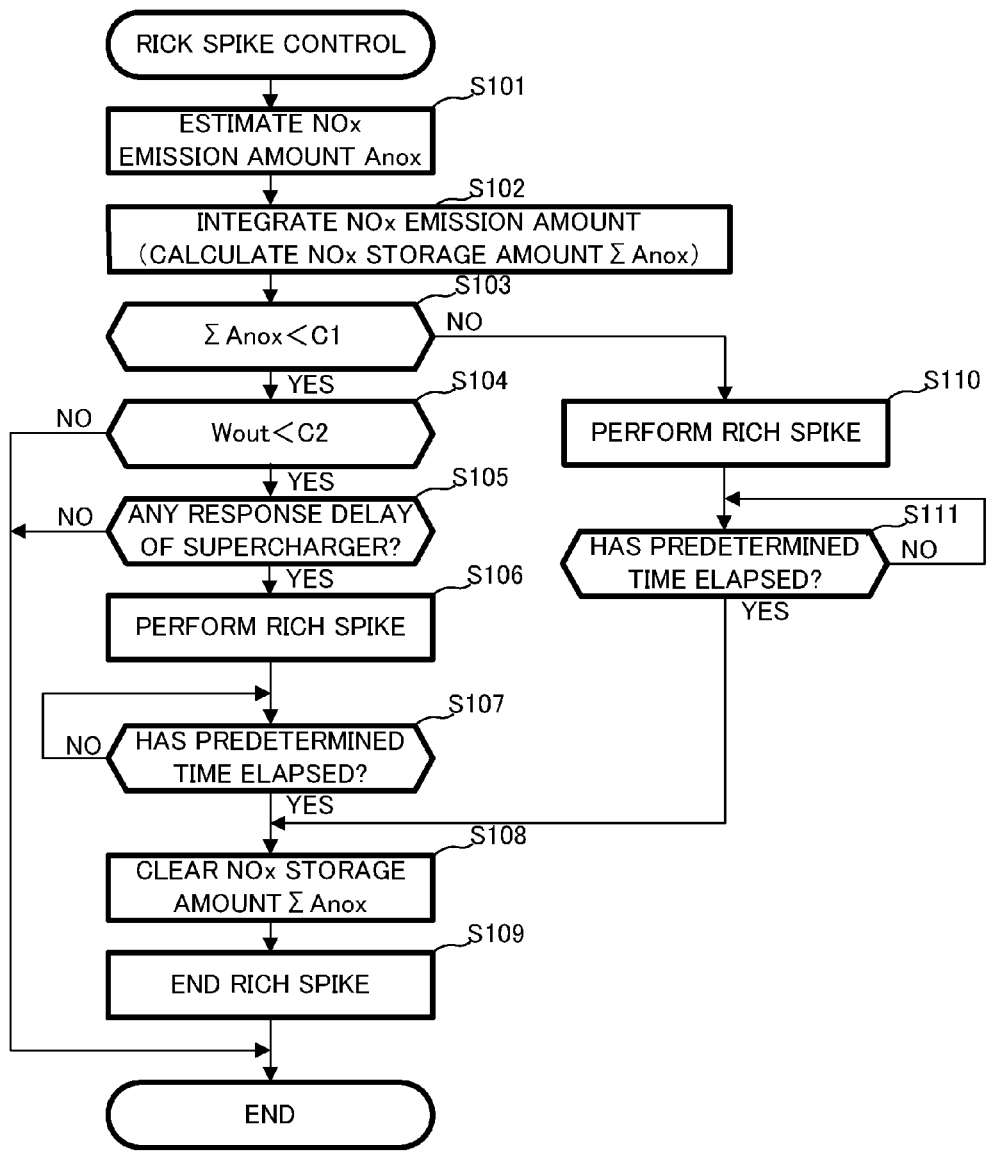
FIG. 4 is a flowchart illustrating rich spike control in the hybrid vehicle in FIG. 1.

Firstly, with reference to FIG. 4, a flow of the rich spike control will be explained. FIG. 4 is a flowchart illustrating the rich spike control. The rich spike control is control performed always with a predetermined period in an operation period of the hybrid vehicle 1 (e.g. a period between ready-on to ready-off).

In FIG. 4, firstly, a NOx emission amount Anox is estimated (step S1019. The NOx emission amount Anox is the amount of NOx produced from the engine 200 per unit time. The NOx emission amount Anox is estimated on the basis of operating points of the engine 200. The operating point is an operating condition of the engine 200, which is defined by the number of engine revolutions NE of the engine 200 and the engine torque Te.

A process of the NOx production in the cylinder is a type of chemical reaction. Therefore, a NOx production amount in one combustion process in one cylinder can be obtained if the control air-fuel ratio and the fuel injection amount are known. Moreover, the number of engine revolutions NE corresponds to the number of combustion processes per unit time. Therefore, the NOx emission amount Anox can be obtained from information about the operating points.

To estimate the NOx emission amount Anox, various known methods can be applied. For example, the NOx emission amount Anox may be associated with each of the operating points, experimentally, experientially, or theoretically in advance, and may be stored as control information in a form of a map or the like. In this case, the ECU 100 can relatively simply estimate the NOx emission amount Anox by selecting a corresponding value from the map. At this time, if the NOx emission amount Anox is not associated with all the operating points, an interpolation process or a correction process may be performed, as occasion demands. Alternatively, the NOx emission amount Anox may be individually and specifically calculated at each time from parameters of the operating points, on the basis of arithmetic algorithm formulated experimentally, experimentally, experientially, or theoretically in advance.

If the NOx emission amount Anox is estimated, the ECU 100 integrates the estimated NOx emission amount Anox, and calculates a NOx storage amount ΣAonx (step S102). The NOx storage amount ΣAonx is the amount of storage of NOx in the NOx storage/reduction catalyst 215. The engine 200 is the lean burn engine in which the control air-fuel ratio is the lean air-fuel ratio, as described above, and thus, the reduction reaction of NOx rarely proceeds in the three-way catalyst 214, which is in an oxygen rich atmosphere. Therefore, an integrated value of the NOx emission amount Anox can be treated as the NOx storage amount ΣAonx.

If the NOx storage amount ΣAonx is calculated, it is determined whether or not the calculated NOx storage amount ΣAonx is less than a reference value C1 (step S103). The reference value C1 is a value for defining timing of regeneration of the NOx storage/reduction catalyst 215 (i.e. the reduction of NOx), and is a value arbitrarily determined according to a NOx storage capacity or capability of the NOx storage/reduction catalyst 215 or the like. In other words, the reference value C1 defines execution timing of the rich spike in the lean burn engine.

If the NOx storage amount ΣAonx is greater than or equal to the reference value C1 (the step S103: NO), the ECU 100 performs the rich spike in order to regenerate the NOx storage/reduction catalyst 215 (step S110). The rich spike means a measure to temporally change the control air-fuel ratio from the lean air-fuel ratio, which is leaner than the stoichiometric ratio, to a rich air-fuel ratio, which is richer than the stoichiometric ratio, thereby increasing the fuel injection amount. If the rich spike is performed, the three-way catalyst 213 is in a fuel rich atmosphere, so that HC and CO easily blow through the three-way catalyst 213. Moreover, the production of $H_2$ is accelerated. All of those are the reducing agents, and have a capability of reducing NOx stored in the NOx storage/reduction catalyst 215. Due to the action of the reducing agents, the stored NOx is desorbed from the NOx storage/reduction catalyst 215 and is purified.

If the rich spike is performed, it is determined whether or not a predetermined time has elapsed (step S111). While the predetermined time has not elapsed (the step S111: NO), the rich spike is continued. The predetermined time is a time required for the NOx storage amount ΣAonx of the NOx storage/reduction catalyst 215 to be zero, and is a variable value determined experimentally in advance. The predetermined time is set to be variable because a NOx reduction speed (i.e. a NOx reduction amount per unit time) in the NOx storage/reduction catalyst 215 varies depending on the operating points of the engine 200. The NOx reduction speed can be calculated in known methods, on the basis of the information about the operating points of the engine 200. Alternatively, the operating points of the engine 200 and the NOx reduction speed may be associated with each other, experimentally, experientially, or theoretically in advance, and may be stored in a form of a control map or the like.

If the predetermined time has elapsed (the step S111: YES), the NOx storage amount ΣAonx is cleared (i.e. initialized) (step S108), and the ECU 100 ends the rich spike (step S109). If the rich spike is ended, the rich spike control is ended. As described above, however, the rich spike control is always performed in the operation period of the hybrid vehicle 1, and the process is restarted from the step S101 after a predetermined interval.

On the other hand, in the step S103, if the NOx storage amount ΣAonx is less than the reference value C1 (the step S103: YES), the ECU 100 determines whether or not a discharge limit value Wout of the battery 30 is less than a reference value C2 (step S104). The reference value C2 is a value determined by an experimental adaptive process in advance. If the discharge limit value Wout is greater than or equal to the reference value C2 (the step S104: NO), the rich spike control is ended.

In the battery 30, input/output amounts of electric power per unit time are limited. A limit value on an output side is the discharge limit value Wout, and electric power that exceeds the discharge limit value Wout is not allowed to be taken out. A limit value on an input side is a charge limit value Win, and charging that exceeds the charge limit value Win is not allowed. The discharge and charge limit values are determined mainly by the battery temperature Tbat.

The battery temperature Tbat influences the performance of the battery 30. For example, each of the discharge limit value Wout and the charge limit value Win decreases at a low temperature and a high temperature (i.e. each of discharging and charging is significantly limited). The discharge and charge limit values are determined by the ECU 100 on the basis of such a concept.

In the step S104, if the discharge limit value Wout is less than the reference value C2 (the step S104: YES), the ECU 100 determines whether or not there is a response delay of the turbocharger 250 (step S105).

The response delay of the turbocharger 250 indicates a phenomenon in which if torque required for the drive shaft 500 (i.e. a required value of drive shaft torque) rapidly increases, for example, due to a rapid increase in the accelerator opening degree Ta or the like (e.g. when acceleration is required), the supercharging by the turbocharger 250 does not catch up and the intake air amount becomes insufficient, thereby causing the engine torque Te to be less than a required value.

Whether or not there is the response delay of the turbocharger 250 is estimated on the basis of a change rate of the accelerator opening degree Ta (or a change amount of the accelerator opening degree Ta per unit time) and the number of revolutions of the compressor impeller 255 (hereinafter expressed as the "number of compressor revolutions", as occasion demands).

For example, if the change rate of the accelerator opening degree Ta is high, a change rate of the required value of the drive shaft torque is also high, and thus, the response delay of the turbocharger 250 becomes apparent more easily than if the change rate is low. If the number of compressor revolutions is high, the turbocharger 250 can perform a supercharging operation without a delay in practice; however, if the number of compressor revolutions is low, an increase (or rising) in supercharging is easily delayed. Therefore, as a simple method, threshold values are respectively set for the change rate of the accelerator opening degree Ta and the number of compression revolutions, and if the change rate of the accelerator opening degree Ta is greater than the threshold value and if the number of compression revolutions is less than the threshold value, it may be determined that there is the response delay of the turbocharger 250. The number of compression revolutions can be directly detected by a detecting device, such as a sensor. In the embodiment, the number of compression revolutions is indirectly estimated by the compressor outlet/inlet pressure ratio Rp described above.

The response delay of the turbocharger 250 tends to occur, more easily, as the atmospheric pressure becomes lower and as intake air temperature becomes higher. Therefore, when it is determined whether or not there is the response delay, correction may be performed on the basis of the atmospheric pressure and/or the intake air temperature at that time point. For example, after an index value indicating a possibility of the response delay is determined, the index value may be multiplied by a correction coefficient based on the atmospheric pressure and the intake air temperature to determine a final index value, and it may be determined whether or not there is the response delay on the basis of whether or not the final index value is greater than or equal to a threshold value. If it is determined that there is the response delay (the step S105: NO), the rich spike control is ended.

On the other hand, if it is expected that there is the response delay (the step S105: YES), an insufficiency of the drive shaft torque of the hybrid vehicle 1 needs to be compensated in some manner to compensate for the drive shaft torque.

Here, the response delay of the turbocharger 250 is a phenomenon that occurs independently of the discharge limit value Wout of the battery 30. Therefore, if the discharge limit value Wout is greater than or equal to the reference value C2 (i.e. if the step S104 branches to a "NO" side), there could be the response delay of the turbocharger 250. In this case, since the battery 30 has a sufficient electric power supply capacity or capability, the insufficiency of the drive shaft torque can be compensated for by MG2 torque Tmg2 generated by the motor generator MG2. The ECU 100 can estimate the engine torque Te from the intake air amount Ga, the control air-fuel ratio (i.e. the lean air-fuel ratio), ignition timing, or the like. Alternatively, the engine torque Te can be estimated from reaction torque of the engine 200 born by the motor generator MG1. Therefore, the insufficiency of the drive shaft torque can be accurately recognized at that time point.

In contrast, if the discharge limit value Wout of the battery 30 is less than the reference value C2, the compensation for the drive shaft by the MG2 torque Tmg2 is possibly restricted by the discharge limit value Wout. If there is the response delay of the turbocharge 250 when the discharge limit value Wout is less than the reference value C2, the ECU 100 performs the rich spike (step S106). The rich spike in the step S106 is a measure that is different from the rich spike in the step S110 described above, only in the point that the execution timing thereof is not derived from the NOx storage amount ΣAonx of the NOx storage/reduction catalyst 215.

If the rich spike is performed, it is determined whether or not a predetermined has elapsed (step S107). If the predetermined has not elapsed (the step S107: NO), the rich spike is continued. The predetermined time is a time required for the NOx storage amount ΣAonx of the NOx storage/reduction catalyst 215 to be zero. However, as opposed to the rich spike in the step S110, the NOx storage amount ΣAonx at that time point can adopt various values in a range of being less than the reference value C1. Therefore, the predetermined time in the step S107 is determined on the basis of the NOx reduction speed determined by the operating point of the engine 200 and the NOx storage amount ΣAonx at that time point.

If the predetermined has elapsed (the step S107: YES), the process is moved to the step S108, and the NOx storage amount ΣAonx is initialized. After the rich spike is ended (step S109), the rich spike control is ended. The rich spike control is performed in the above manner.

Figure 5:
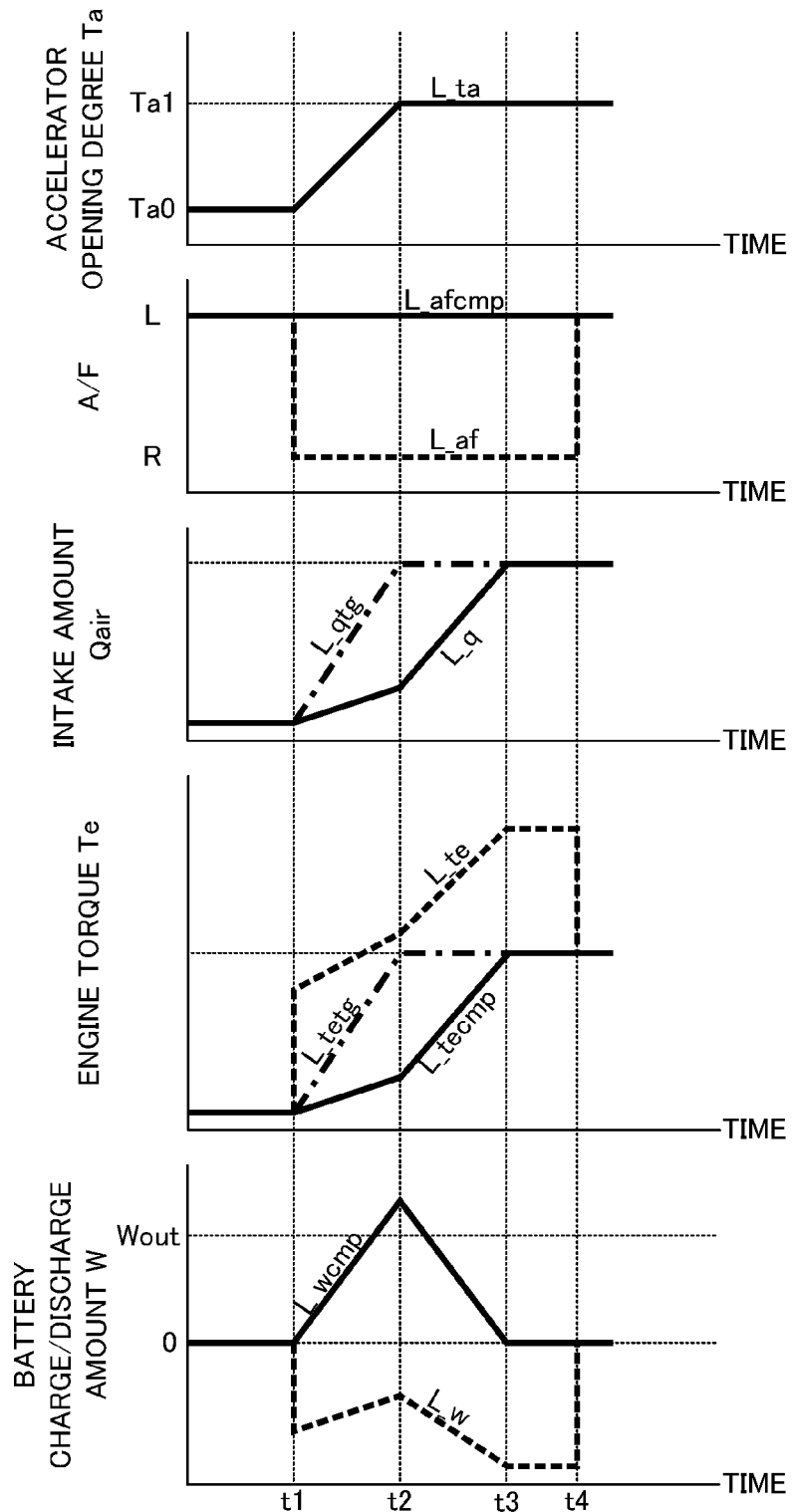
FIG. 5 is a timing chart illustrating one time transition of various controlled variables in the rich spike control in FIG. 4.

Next, with reference to FIG. 5, an effect of the rich spike control according to the embodiment will be explained. FIG. 5 is a timing chart illustrating one time transition of various controlled variables of the hybrid vehicle 1 in an execution procedure of the rich spike control in FIG. 4.

FIG. 5 illustrates, in order from the top, respective time transitions of the accelerator opening degree Ta, a control air-fuel ratio A/F, an intake air amount Qair, the engine torque Te, and a charge/discharge amount W of the battery 30.

The intake air amount Qair is an amount of the air actually sucked into each of the cylinders of the engine 200. Moreover, the intake air amount Qair adopts a positive value during discharging, and adopts a negative value during charging.

FIG. 5 exemplifies a case where there is a rapid change in the accelerator opening degree Ta at a time point t1. Moreover, FIG. 5 exemplifies the respective time transitions of the controlled variables when the rich spike intended to compensate for the drive shaft torque is not performed, in solid lines, as a comparative example to be used for comparison with the embodiment. In other words, the comparative example corresponds to a case where the drive shaft torque is compensated for by the MG2 torque Tmg2, independently of the discharge limit value Wout, with respect to the response delay of the turbocharger 250.

Firstly, the comparative example will be explained.

In the comparative example, for a change in the accelerator opening degree Ta that occurs at the time point t1 (refer to L_Ta illustrated), the control air-fuel ratio A/F is maintained at a lean air-fuel ratio L, which is leaner than the stoichiometric ratio (refer to L_afcmp illustrated). In the comparative example, a rich air-fuel ratio R, which is richer than the stoichiometric ratio, is not adopted except at the execution timing of the rich spike based on the NOx storage amount ΣAonx.

On the other hand, the intake air amount Qair cannot follow the rapid change in the accelerator opening degree Ta, and is significantly insufficient (refer to L_q illustrated) for a target intake air amount corresponding to the accelerator opening degree Ta (refer to L_qtg (or an alternate long and short dash line) illustrated). In other words, FIG. 5 corresponds to a situation in which there is the "response delay of the supercharger" described above.

If the response of the intake air amount Qair is delayed with respect to target response characteristics as described above, the response of the engine torque Te is also necessarily delayed (refer to L_tecmp illustrated) with respect to response characteristics of target engine torque (refer to L_tetg (or an alternate long and short dash line) illustrated). A difference between the tarte engine torque and the actual engine torque Te caused by the response delay becomes apparent as a reduction in power performance of the hybrid vehicle 1 if no measures are taken.

Here, the insufficiency of the drive shaft torque is compensated for by the MG2 torque Tmg2, as described above. This is illustrated in the comparative example. In other words, in a period in which the drive shaft torque is insufficient due to the response delay of the turbocharger 250, electric power is taken out from the battery 30. Therefore, the charge/discharge amount W of the battery 30 starts to increase in an area on a discharge side of the time point t1 (i.e. in a positive area) (refer to L_wcmp illustrated).

Here, in particular, if the rich spike intended to compensate for the drive shaft torque according to the embodiment is not performed, a discharge amount of the battery 30 can exceed the discharge limit value Wout in at least a part of a period of the compensation for the drive shaft torque by the MG2 torque Tmg2. The comparative example (in the solid line) in FIG. 5 illustrates that the battery charge/discharge amount W exceeds the discharge limit value Wout (i.e. that over-discharging occurs) in a period near a time point t2. Such a situation occurs more easily as the discharge limit value Wout is smaller, i.e. as the degree of discharge limit of the battery 30 is higher.

On the other hand, in practice, from the viewpoint of protecting the battery 30, such over-discharging is not allowed (i.e. the discharge limit value Wout is set for that purpose). Therefore, in this period, the MG2 torque Tmg2 required to cancel the insufficiency of the drive shaft torque cannot be outputted from the motor generator MG2. Necessarily, the drive shaft torque is insufficient for the required value, and the power performance decreases.

Next, an effect of the rich spike intended to compensate for the drive shaft torque according to the embodiment will be explained. The respective time transitions of the controlled variables according to the embodiment are illustrated in thick dashed lines in FIG. 5.

According to the rich spike control in the embodiment, if the discharge limit value Wout is less than the reference value C2 (i.e. if it is determined that the discharge amount of the battery 30 possibly conflicts with the discharge limit value Wout, as illustrated in L_wcmp illustrated), the rich spike control is performed at the time point t1 at which the accelerator opening degree Ta starts to rapidly change (refer to L_af illustrated). In other words, the rich spike is started at timing unrelated to the NOx storage amount ΣAonx.

An execution period of the rich spike control exemplified in FIG. 4 is set to be sufficiently short, and the determination of whether or not there is the response delay of the turbocharger 250 (the step S105) is completed at a time point substantially equal to the time point t1 at which there is a change in the accelerator opening degree Ta.

If the rich spike is started, the engine torque Te increases discontinuously at the time point t1 (refer to L_te illustrated). This is because the fuel injection amount increases by the amount of a change in the control air-fuel ratio, and torque increases by the amount of the increase in the fuel injection amount.

On the other hand, if the rich spike is started, the engine torque exceeds the required value, and the drive shaft torque exceeds the required value. For the viewpoint of drivability, it is not allowed that the drive shaft torque becomes greater than the required value. Thus, an excess of the drive shaft torque is regenerated as electric power by the motor generator MG2.

Therefore, the charge/discharge amount of the battery 30 changes in a negative area, as opposed to that in the comparative example. In other words, the battery 30 is charged (refer to L_w illustrated), and it is avoided that the charge/discharge amount W is restricted by the discharge limit value Wout.

As described above, according to the rich spike control in the embodiment, if the drive shaft torque by the MG2 torque Tmg2 possibly conflicts with the discharge limit value Wout of the battery 30, the compensation of the drive shaft torque by the rich spike is selected. It is therefore possible to make the drive shaft torque always match the required value, and to avoid the reduction in power performance caused by the response delay of the turbocharger 250.

The rich pike caused by the insufficient drive shaft torque is continued until it is estimated that the NOx storage amount ΣAonx at that time point is all reduced, in the rich spike control in FIG. 4. In FIG. 5, the timing corresponds to a time point t4. On the other hand, the ECU 100 recognizes the NOx storage amount ΣAonx at a rich spike start time point and a NO reduction amount by the rich spike, and thus, the rich spike is not necessarily continued until the NOx storage amount ΣAonx becomes zero. For example, the rich spike may be ended at a time point t3 at which the intake air amount Qair reaches the target intake air amount and at which the engine torque Te matches the required value. Even in this case, the reduction in power performance caused by the response delay of the turbocharger 250 is avoided without a problem.

In this case, however, in the process of clearing the NOx storage amount ΣAonx in the step S108 in FIG. 4, it is updated to a residual amount of NOx stored in the NOx storage/reduction catalyst 215 at that time point. Then, the integration of the NOx emission amount Anox is restarted from the updated residual amount.

Second Embodiment

Figure 6:
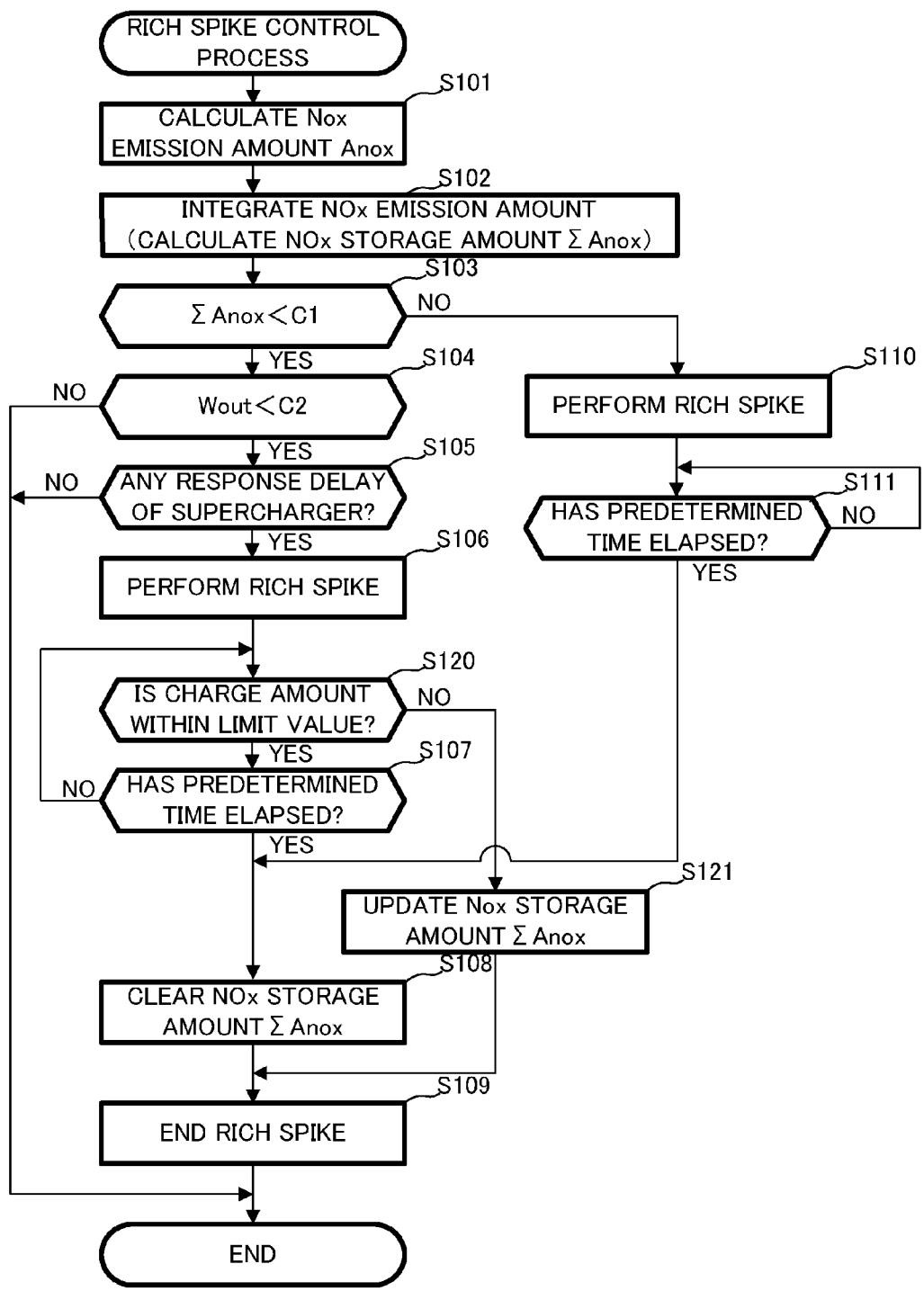
FIG. 6 is a flowchart illustrating rich spike control in a second embodiment.

Next, rich spike control according to a second embodiment of the present invention will be explained. Firstly, with reference to FIG. 6, a flow of the rich spike control according to the second embodiment will be explained. FIG. 6 is a flowchart illustrating the rich spike control in the second embodiment. In FIG. 6, the same parts as those in FIG. 4 will carry the same reference numerals, and an explanation thereof will be omitted, as occasion demands.

In FIG. 6, if the rich spike is performed to compensate for the insufficient drive shaft torque caused by the response delay of the turbocharger 250 (the step S106), the ECU 100 further determines whether or not the charging of the battery 30 is performed in a range of not conflicting with the charge limit value Win (step S120).

A positive value of the charge/discharge amount W corresponds to discharging, and a negative value corresponds to charging, as described above. The expression that charging does not conflict with the limit value namely means that the charge/discharge amount W is greater than or equal to the charge limit value Win.

If the charging is performed in an allowable range (the step S120: YES), i.e. if the charge/discharge amount W is greater than or equal to the charge limit value Win, it is determined whether or not the predetermined has elapsed (the step S107). If the predetermined has not elapsed (the step S107: NO), the process is returned to the step S120.

On the other hand, if the charging that exceeds the limit value is performed (the step S120: NO), i.e. if the discharge/charge amount W is less than charge limit value Win, the ECU 100 updates the NOx storage amount ΣAonx on the basis of the NOx storage amount ΣAonx at the rich spike start time point and the NO reduction amount after the start of the rich spike (step S121). If the NOx storage amount ΣAonx is updated, the ECU 100 returns the control air-fuel ratio to the lean air-fuel ratio and ends the rich spike (step S109). If the rich spike is ended, the rich spike control is ended. The rich spike control according to the second embodiment proceeds in this manner.

Figure 7:
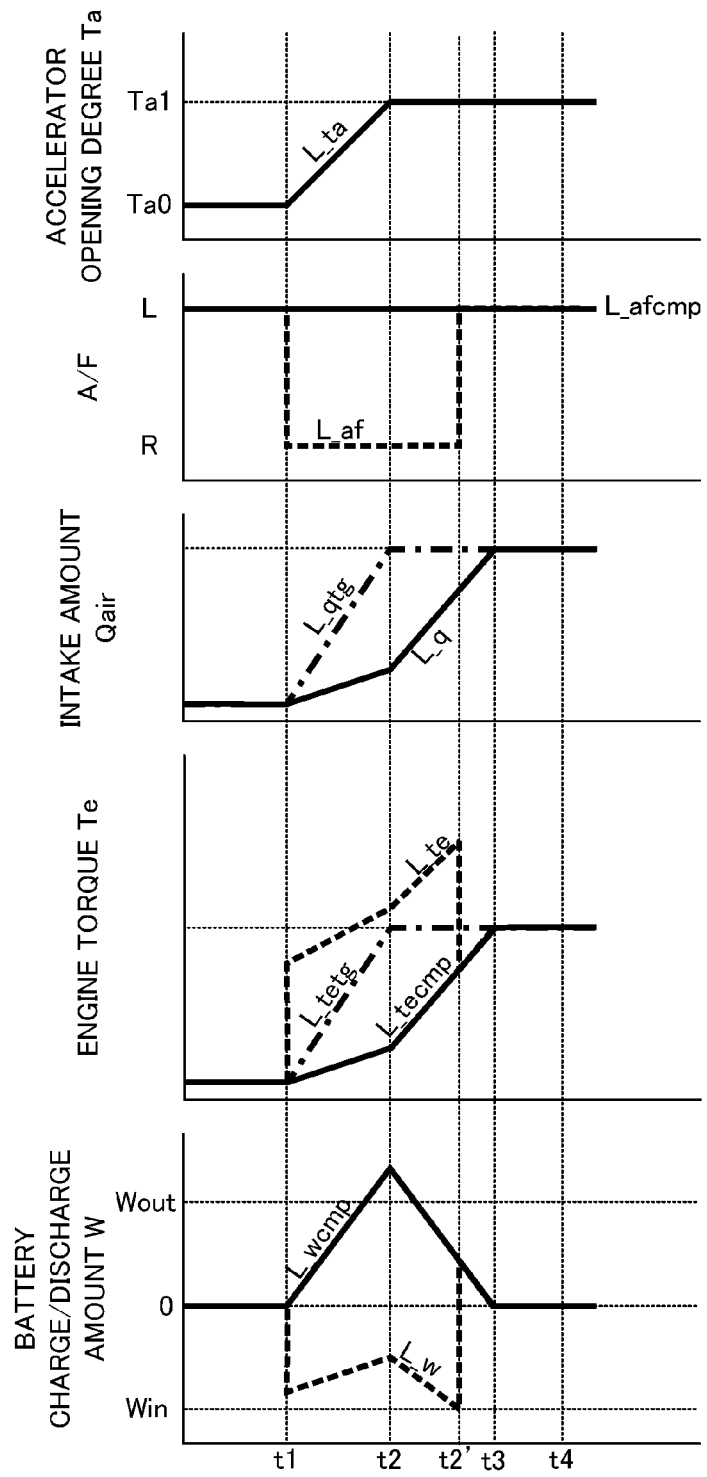
FIG. 7 is a timing chart illustrating one time transition of various controlled variables in the rich spike control in FIG. 6.

Next, an effect of the rich spike control according to the second embodiment will be explained with reference to FIG. 7. FIG. 7 is a timing chart illustrating one time transition of various controlled variables of the hybrid vehicle 1 in the execution procedure of the rich spike control. In FIG. 7, the same parts as those in FIG. 5 will carry the same reference numerals, and an explanation thereof will be omitted, as occasion demands.

In FIG. 7, as in the first embodiment, the control air-fuel ratio is changed to the rich air-fuel ratio R at a time point t1, and the rich spike is stared.

Here, it is assumed that the discharge/charge amount W conflicts with the charge limit value Win at a time point t2' in a period in which an excess of the engine torque Te is regenerated on the motor generator MG2 to maintain the drive shaft torque at target torque. In other words, if the power regeneration is continued at that scale or more, the battery 30 is over-charged.

Thus, in the second embodiment, the rich spike is ended at the time point t2'. In other words, the rich spike in an over-charging area is not allowed. In FIG. 7, the drive shaft torque is insufficient in a period from the time point t2' at which the rich spike is ended to a time point t3 at which the intake air amount Qair reaches the target intake air amount. Thus, the drive of the motor generator MG2 is changed to the power-running drive, and the drive shaft torque is maintained at the target torque by the discharging from the battery 30 (refer to L_w illustrated). In other words, according to the rich spike control in the second embodiment, it is possible to prevent the battery 30 from being over-charged without an insufficiency of the drive shaft torque.

In the embodiment, the control air-fuel ratio is returned to the previous lean air-fuel ratio (or the control air-fuel ratio in the normal operation) if the charge/discharge amount W conflicts with the charge limit value Win; however, this is one example. For example, in this case, the control air-fuel ratio may be returned to the control air-fuel ratio in the normal operation, stepwise, through the stoichiometric air-fuel ratio or an air-fuel ratio near the stoichiometric air-fuel ratio.

Moreover, in the embodiment, the discharge and charge limit values depend mainly on the battery temperature; however, there is also such control that the charge limit value Win is reduced if the battery 30 has a high SOC, for the viewpoint of battery protection. In this case, the air-fuel ratio may be changed in a range in which the motor generator MG2 is driven in the power-running manner (i.e. in a range in which there is power consumption) in the situation in which the charge/discharge amount W conflicts with the charge limit value Win. If the air-fuel ratio is set to be leaner than the air-fuel ratio when the rich spike is performed (or the rich air-fuel ratio), the engine torque Te is reduced. Therefore, the change in the air-fuel ratio on condition of the power consumption associated with the power-running drive of the MG2 can be one aspect of the control that the air-fuel ratio is set to be leaner than the air-fuel ratio when the rich spike is performed.

Alternatively, the air-fuel ratio may be appropriately controlled in a range that is leaner than the rich air-fuel ratio when the rich spike is performed (i.e. a range that can include the stoichiometric ratio rich air-fuel ratio), in a range in which the discharge/charge amount W is within the charge limit value Win, in order to continue to reduce the stored NOx as long as possible.

In the first and second embodiments, if there is the response delay in the turbocharger 250, it is determined which is used to compensate for the drive shaft torque, torque assist by the MG2 torque Tmg2 or the rich spike, by comparing the discharge limit value Wout with the reference value C.

Here, the discharge limit value Wout is not an index value for strictly defining whether or not there is over-charging when the drive shaft torque is compensated for by the MG2 torque Tmg2. In other words, even if the discharge limit value Wout is a maximum value that can be adopted in control of the hybrid vehicle 1, there is a possibility that the discharge amount required to compensate for the drive shaft torque exceeds the discharge limit value Wout. In the same manner, even if the discharge limit value Wout is sufficiently low, there is also a possibility that the discharge amount does not exceed the discharge limit value Wout. However, it is apparent that as the discharge limit value Wout becomes lower, the discharge amount conflicts with the discharge limit value Wout, more likely, in the period of the compensation for the drive shaft torque by the MG2 torque Tmg2. Therefore, there is practically no problem in using the discharge limit value Wout as the index value to select either of the measures.

On the other hand, in compensating for the insufficient drive shaft torque, there is no change in the point that the drive shaft torque is maintained at the target torque, whether the MG2 torque Tmg2 accompanying the discharging of the battery 30 is used or the rich spike accompanying the charging of the battery 30 is used. Moreover, the NOx stored in the NOx storage/reduction catalyst 215 needs to be reduced in time, and the rich spike intended to compensate for the drive shaft torque does not lead waste of fuel.

In other words, the control apparatus for the hybrid vehicle according to the present invention can apply the rich spike more flexibly than before, by providing the rich spike with a purpose other than the NOx reduction, and can efficiently and effectively suppress the reduction in power performance caused by the response delay of the supercharger.

The present invention is not limited to the aforementioned embodiments, but various changes may be made, if desired, without departing from the essence or spirit of the invention which can be read from the claims and the entire specification. A control apparatus for a hybrid vehicle that involves such changes is also intended to be within the technical scope of the present invention.

INDUSTRIAL APPLICABILITY

The present invention can be applied to control a hybrid vehicle provided with an internal combustion engine having a supercharger and a NOx storage/reduction catalyst.

DESCRIPTION OF REFERENCE NUMERALS

1 hybrid vehicle
100 ECU
200 engine
215 NOx storage/reduction catalyst
250 turbocharger
MG1, MG2 motor generator

The invention claimed is:

1. A control apparatus for a hybrid vehicle, configured to control a hybrid vehicle, the hybrid vehicle comprising:
an internal combustion engine comprising a supercharger and a NOx storage/reduction catalyst, the internal combustion engine being configured to be operated at an air-fuel ratio that is leaner than a stoichiometric ratio;
a rotary electric machine configured to input/output torque to/from a drive shaft coupled with drive wheels; and
a battery configured to input/output electric power,
said control apparatus comprising:
a determining device configured to determine whether or not there is a response delay of the supercharger;
a torque controlling device configured to control torque of the rotary electric machine; and
an air-fuel ratio controlling device configured to control an air-fuel ratio of the internal combustion engine, wherein
the torque controlling device controls the torque of the rotary electric machine to compensate for an insufficiency of torque of the drive shaft, and the air-fuel ratio controlling device controls the air-fuel ratio of the internal combustion engine to be temporally richer than the stoichiometric ratio if it is determined that there is the response delay when the output limit value of the battery is less than the predetermined value.

2. The control apparatus for the hybrid vehicle according to claim 1, wherein said torque controlling device controls the rotary electric machine in such a manner that an excess of the torque of the drive shaft is regenerated as electric power if the torque of the drive shaft is excessive in a period in which the air-fuel ratio is controlled to be temporally richer than the stoichiometric ratio.

3. The control apparatus for the hybrid vehicle according to claim 2, wherein said air-fuel ratio controlling device sets the air-fuel ratio to be leaner than the air-fuel ratio that is controlled to be richer than the stoichiometric ratio, when an electric power regeneration amount according to the excess conflicts with an input limit value of the battery.

* * * * *